United States Patent [19]
Cronin et al.

[11] Patent Number: 5,457,218
[45] Date of Patent: Oct. 10, 1995

[54] PRECURSOR AND RELATED METHOD OF FORMING FOR USE IN FORMING ELECTROCHROMIC COATINGS

[75] Inventors: John P. Cronin; Daniel J. Tarico; Anoop Agrawal; Raymond L. Zhang, all of Tucson, Ariz.

[73] Assignee: Donnelly Corporation, Holland, Mich.

[21] Appl. No.: 115,855

[22] Filed: Sep. 2, 1993

Related U.S. Application Data

[62] Division of Ser. No. 886,505, May 20, 1992, Pat. No. 5,252,354.

[51] Int. Cl.⁶ .............................. C07F 9/00; C07F 13/00; C07F 11/00
[52] U.S. Cl. .................. 556/44; 556/49; 556/57; 556/61; 556/136; 556/146
[58] Field of Search ................... 556/44, 49, 57, 556/61, 136, 146

[56] References Cited

U.S. PATENT DOCUMENTS

| | | | |
|---|---|---|---|
| 3,437,515 | 4/1969 | Quinn et al. | 117/100 |
| 4,420,500 | 12/1983 | Nakatani et al. | 427/54.1 |
| 4,855,161 | 8/1989 | Moser et al. | 427/108 |
| 4,959,247 | 9/1990 | Moser et al. | 427/126.5 |
| 5,034,246 | 7/1991 | Mance et al. | 427/126.3 |

FOREIGN PATENT DOCUMENTS

| | | |
|---|---|---|
| 2527219 | 5/1982 | France . |
| 5382999 | 1/1980 | Japan . |

OTHER PUBLICATIONS

Kazusuke Yamanaka et al., "Peroxotungstic Acid Coated Films for Electrochromic Display Devices," *Jap. J. App. Phys.*, vol. 25, No. 9 (1986), pp. 1420–1426.

A. Gupta et al., "Superconducting Oxide Films With High Transition Temperature Prepared From Metal Trifluoroacetate Precursors," *Appl. Phys. Lett.*, vol. 52, No. 24 (1988), pp. 2077–2079.

"Dissolution of Tungsten by Hydrogen Peroxide," *Analytical Chemistry*, vol. 33, Jul.–Dec. 1961, pp. 1125–1126.

*Primary Examiner*—Porfirio Nazario-Gonzales
*Attorney, Agent, or Firm*—Price, Heneveld, Cooper, DeWitt & Litton

[57] ABSTRACT

Electrochromic coating solutions are prepared by reacting a transition metal with a mixture of hydrogen peroxide and an organic acid. The resulting transition metal-peroxy acid product is esterified by reacting with lower carbon alcohols to produce a peroxyester-transition metal derivative. This derivative in solution in lower carbon alcohols provides a working solution into which a substrate having a conductive surface is preferable dipped and removed at a rate sufficient to give a coating of a desired thickness over the conductive surface. Spray or spin coating can be used to apply the coating to the conductive surface of the substrate. The coating is then dried and is externally fired in an oven to complete the necessary reactions to yield an electrochromic oxide coating having exceptional electrochromic properties.

32 Claims, No Drawings

PRECURSOR AND RELATED METHOD OF FORMING FOR USE IN FORMING ELECTROCHROMIC COATINGS

CROSS-REFERENCE TO RELATED APPLICATION

This is a division of application Ser. No. 07/886,505, filed May 20, 1992, now U.S. Pat. No. 5,252,354.

BACKGROUND OF THE INVENTION

The present invention relates to methods of making optical quality coatings of inorganic oxides on glass or equivalent substrates, such as metals or ceramics. These inorganic oxide coatings are electrochromic and have other desirable properties which allow their use as electrically conducting coatings, optical coatings, wear resistant coatings and anti-reflective coatings. Electrochromic films undergo reversible coloration induced by an applied electric field or current. These inorganic electrochromic layers can be broadly classified into those that color cathodically due to the double injection of electron and cation (Group VI-B oxides such as $WO_3$ and $MoO_3$) and those Group VIII oxides that color anodically (such as $IrO_2$, $Rh_2O_3$, NiO and CoO). Such coatings are used in information display devices, solar control windows and light modulators.

The most common way to deposit electrochromic films is by vacuum techniques, typically by evaporation and sputtering. Non-vacuum techniques such as anodization and atmospheric chemical vapor deposition are also reported. Evaporation deposition and sputter coating require a high vacuum. While such techniques require expensive capital equipment, they have been commonly used to produce electrochromic coatings.

Three similar non-vacuum coating techniques which have been used to a limited extent for electrochromic coatings are dip coating, spray coating and spin coating. These techniques offer the advantage of being less capital intensive and thus less expensive. Dip coating, as an example, is commonly used to coat glass with $SiO_2$. This process involves lowering a glass substrate into a solution containing an appropriate precursor of the desired oxide. Spin coating and spray coating are similar to dip coating except that instead of dipping the glass, the precursor solution is applied to the glass, which is spun to spread the coating out, or is sprayed onto heated glass. For all of these methods, the typical starting solution consists of an organic metallic compound which is complexed in a suitable solvent, e.g., for $SiO_2$ coating, tetraethylorthosilicate is dissolved in an ethanolic solution and partially hydrolyzed. In the dipping method, the substrate (glass) is dipped into the solution and withdrawn at a known rate (usually several centimeters per minute), thereby coating the surface with solution. The coating is then dried and fired in an oven to complete hydrolysis and condensation and to densify the newly formed oxide coating.

However, some of the starting materials of the important electrochromic materials, such as alkoxylates, are expensive and do not afford satisfactory coating results if directly dissolved in typical solvents. Also, many commercial dip coatings and commercial processes involve preparation of the dip coating solution in bulk and its subsequent use over several days of dip coating. Such solutions of precursors typically have a gestation period during which hydrolysis is occurring in solution to form a stage of partial hydrolysis suitable to form an acceptable coating. This is followed by a period over which the solution can be used for dip coating. Beyond this window of use, the viscosity of the solution rises such that the solution once again becomes unsuitable for dip coating, and is typically then discarded. Hence, an important low cost approach to creating electrochromic coatings appears to be impractical based on these materials.

French Patent No. 2,527,219 discloses dipping in a colloidal polymetallic acid of a transition metal preferably in aqueous medium. However, such suspensions are reported to be very unstable, having a useful life of 24 hours or less. Nakatani et al., U.S. Pat. No. 4,420,500, disclose the deposition of transparent conducting films onto glass and ceramic substrates from a coating composition containing indium compounds and alkyl tin nitrate compounds. Moser et al., U.S. Pat. No. 4,959,247, disclose the dipping in a solution of transition metal nitrates dissolved in monoalcohols having from 1 to 5 carbon atoms. The coatings are applied to the substrate by a dipping method. However, when using this method, the dipping solution has a limited window of use before and after which desired quality coatings are not formed.

In a similar patent, Moser et al., U.S. Pat. No. 4,855,161, the disclosure of which is herein incorporated by reference, disclose a method for coating a substrate with electrochromic coatings by dipping a substrate having a conductive surface into, or spraying, or spin coating with a solution prepared by reacting an anhydrous halide of an electrochromically active transition metal with a $C_1$ to $C_5$ anhydrous alcohol. However, in this method it is difficult to expel halides at low firing temperatures.

SUMMARY OF THE INVENTION

In the present invention, electrochromic coating solutions are prepared by reacting a transition metal with a mixture of hydrogen peroxide and an organic acid. The resulting transition metal-peroxy acid product is esterified by reacting with lower carbon alcohols and is preferably isolated as a powder. The peroxyester-transition metal derivative is then dissolved in lower carbon alcohols to give the preferable working solution. A substrate with a conductive surface is preferably dipped into the working solution and withdrawn at a rate sufficient to give a coating of the desired thickness over the conductive surface, though spray or spin coating can be used in the broader aspects of the invention. The coating is then dried and fired in an oven to complete the hydrolysis and condensation to yield an electrochromic oxide coating having exceptional electrochromic properties.

DESCRIPTION OF THE PREFERRED EMBODIMENT

Successful dip coatings require that:
1. The coating solution must have an adequate shelf life, preferably two weeks or longer. It must not gel or particulate, and it should be stable within the expected usage lifetime, preferably two weeks or longer.
2. The solution must coat the substrate easily. It must wet the surface and fire to a clear oxide with good cosmetics.
3. Once fired, the coatings must be functional and be substantially free of organic materials. They must have the desired hardness, adhesion, optical properties, electrical properties, etc.
4. The starting materials should be inexpensive.

These objectives are met by reacting tungsten metal (or another transition metal) with a solution of a mixture of hydrogen peroxide and an organic acid, or sequentially reacting the hydrogen peroxide with the metal and then reacting the product with an organic acid. The reaction product is filtered and the filtrate preferably is evaporated to dryness under reduced pressure. The resulting transition metal-peroxy acid product (liquid or powder) is then reacted at room temperature by mixing with a lower carbon alcohol to form a transition metal-peroxyester derivative. This solution can be used for dipping, but preferably the transition metal-peroxyester derivative is isolated by removing excess alcohol under vacuum. This peroxyester-transition metal derivative, when dissolved in a lower carbon alcohol, constitutes the preferred dipping solution. The following disclosure not only outlines a route to manufacture these esters and their use as dip solutions to make electrochromic oxides, but also the use of these esters for making electrochromic oxide coatings.

The reaction between the transition metal, hydrogen peroxide and organic acid is conducted at a temperature controlled at about −10° C. to about 12° C. The ingredients are then allowed to react at that temperature from about 16 to about 26 hours. After the reaction, the reaction product is filtered to remove the solids from the filtrate. The filtrate is then refluxed for about 10 to about 18 hours at from about 45° C. to about 60° C. and then refiltered. This second filtrate may usually be dried to recover the transition metal-peroxy acid product as a powder. The transition metal-peroxy acid product (liquid or powder) is then reacted at room temperature with an alcohol in a flask loaded with a stir bar. The reaction temperature can vary from around 22° C., to around 55° C., and the reaction time can vary from about 30 hours to about one-half hour, depending on temperature. The resultant solution containing this derivative can then be used to coat the conductive surface of a substrate having an electrically conductive surface or the alcohol can be removed and then the product mixed with alcohol again prior to coating the substrate. Other low boiling organic solvents, such as tetrahydrofuran, diethylether or the like, also can be used as carriers. Preferably, the peroxyester-transition metal derivative is stored long-term at below 10° C.

For electrochromic coatings, the transition metal oxide ultimately formed must be electrochromically active. Typical transition metals which can be used as starting materials include those of tungsten, molybdenum, manganese, chromium, rhenium, iridium, nickel and others. The peroxyester derivatives of these transition metals can be used separately or mixtures of them can be used to form electrochromic coatings. Also, transition metal-peroxy acid products can be mixed with other peroxyester-transition metal derivatives to form electrochromic coatings.

In addition, the peroxyester derivatives of these transition metals can be mixed with peroxyester derivatives or peroxy acid products of non-transition metal oxides, such as silica and titanium dioxide, to form electrochromic coatings. Mixtures of transition metal peroxyester derivatives form electrochromic coatings having enhanced color efficiency. Mixtures of a transition metal-peroxyester derivative and a non-transition metal-peroxy acid product or a non-transition metal-peroxyester derivative form electrochromic coatings having enhanced durability.

The peroxide used for forming the peroxy acid product is typically hydrogen peroxide. It is contemplated, however, that other peroxides can be utilized such as peroxyacetic acid and 3-chloroperoxybenzoic acid.

Organic acids are used for forming the peroxy acid product. While a variety of organic acids are operable, the most preferred organic acids are acetic acid and propionic acid.

The preferred method of mixing reactants to form the transition metal-peroxy acid product is to react tungsten (or other transition metal or other oxidizable transition metal species such as metal halide, carbide, etc.) with a solution of a mixture of hydrogen peroxide and acetic acid (or another organic acid). However, variations of this procedure are operable.

This reaction proceeds at temperatures of from about −10° C. to about 12° C. and preferably at about 0° C. The reaction time is from about 16 to about 26 hours and preferably about 24 hours. After filtering to remove unreacted solids, the filtrate is then refluxed for about 10 to about 18 hours, and most preferably about 15 hours, at from about 40° C. to 60° C. (55° C. most preferred). After refluxing, the reaction product is dried under reduced pressure to recover the tungsten peroxy acid product as a slight yellowish powder. These times and temperatures may differ if different transition metals and organic acids are used. Routine experimentation will result in a determination of the best time under each given set of circumstances.

The alcohol used for forming the peroxyester-transition metal derivative from the transition metal peroxy acid product should be a 1 to 5 carbon alcohol, and most preferably a 1 to 3 carbon alcohol. Butyl and pentyl alcohols are broadly operable, but the most preferred alcohols are methanol, ethanol, propanol, isopropanol and mixtures thereof.

When forming the desired transition metal peroxyester derivative, the precise reaction time will vary depending on the transition metal peroxy acid product and alcohol used. Routine experimentation will result in a determination of the best time under each given set of circumstances. For example, the reaction proceeds at room temperature for a period of from about 20 to about 30 hours. Alternatively, the reaction can be completed in about 45 minutes at a temperature of about 50° C.

Upon completion of the reaction, the solution is filtered and the substrate is then dipped into the solution and slowly withdrawn. The ratio of transition metal peroxyester derivative to alcohol will be varied by the formulator as a function of the thickness of the coating desired, the intended substrate withdrawal rate and the solubility of the peroxy ester in the solution. If the solution concentration and withdrawal rate result in too heavy a coating, the coating may crack during drying. Typical solutions will comprise from about 5 to about 20 weight/volume (gms/ml) percent transition metal peroxyester derivative to alcohol, for withdrawal rates of 8 to 50 centimeters/minute.

The thickness of the coating is a function of the withdrawal rate and the viscosity of the dipping solution as shown in Equation 1.

$$t = \left( \frac{2V_s n}{dg} \right)^{1/2}$$

Where:
t=coating thickness
$V_s$=withdrawal rate
n=viscosity
d=coating density
g=gravitational constant The coating thickness can be varied over a wide range merely by regulating the withdrawal rate. If thicker coatings are desired, they can be obtained by using faster withdrawal rates. Typical removal rates will fall between about 8 to 50 centimeters per minute. Such a removal rate will yield coatings of from 500 to 2000 angstroms or more.

The substrate which is to be coated with electrochromic coatings itself must have a conductive surface. Good conductivity is important to achieving a fast response time in the electrochromic coating. In the case of glass or ceramic substrates, such conductivity at the surface can be achieved by applying a conductive coating prior to the electrochromic coating. Preferably, this coating has a sheet resistance of less than 10 ohms per square.

In glass applications where one should be able to see through the glass and the conductive coating, it is important that the conductive coating be very thin so that light transmission is not excessively inhibited. In order to achieve a sheet resistance of less than about 10 ohms per square and still have a coated piece of glass with a light transmission of 85% or greater, the material used to create the conductive coating should have a specific resistivity of less than about $8 \times 10^{-4}$ ohm centimeters, and most preferably less than about $2 \times 10^{-4}$ ohm centimeters. Indium tin oxide coatings (ITO) can be achieved which have a specific resistivity of about $2 \times 10^{-4}$ ohm centimeters. ITO is the most preferred coating material for glass, ceramic or equivalent substrates which themselves are nonconductive. Alternative transparent conductive coatings which could also be used are doped oxides of tin, cadmium and zinc.

The as-deposited coating is converted to an electrochromically active coating by removal of volatile organics and by hydrolysis, condensation and similar reactions, preferably by firing at temperatures of about 100° C. to about 350° C. Firing is preferably allowed to proceed for about 15 to about 120 minutes. Different transition metal peroxyester derivative coatings will require differing firing conditions, as will be appreciated by reference to the examples herein. However, for some applications mere drying of the as-deposited coating in ambient atmosphere at room temperature, or at oven temperatures of about 25° C. to 100° C., suffices. Also, since such firing occurs in the presence of oxygen, the resultant coating is principally metal oxide.

Firing also has an important impact on coating density and electrochromic coloring efficiency. Increasing firing temperature increases film density. This makes the film tougher and more resistant to scratching and the like.

The optical transmission of typical coatings made in accordance with the present disclosure decreases from in excess of 85% to less than 15% in a matter of seconds, giving an easily visible and rapid color change.

EXAMPLES

The following Examples illustrate the preparation of preferred coating solutions:

Example 1

Forty (40) milliliters of deionized water was placed in a one liter pear-shaped flask loaded with a stirring bar. The flask was placed in an ice bath with the temperature controlled at 0°±1° C. Eight hundred (800) milliliters of a 50:50 solution of hydrogen peroxide (30 weight %) and glacial acetic acid was added to the flask. The mixture was equilibrated to the bath temperature by stirring for 30 minutes. Sixty-five (65) grams of tungsten metal was then added and the mixture was allowed to react for 24 hours. After the reaction time, any solids present were filtered through coarse filter paper (Whatman 54) and then through fine filter paper (Whatman 42). The filtrate was a clear, slightly yellow, liquid. This liquid was refluxed for 18 hours at 55° C. and refiltered through fine filter paper. The filtrate was dried under vacuum (using a water aspirator) at 65° C. to recover powdered tungsten peroxy acid product.

Fifty (50) grams of the tungsten peroxy acid product was dissolved in 250 milliliters of dry ethanol while stirring at room temperature for 20 to 30 hours or reacted with ethanol at 50° C. for 45 minutes to form a clear, light yellow, solution. The solution was used as a dip solution to make the tungsten oxide coatings on glass. An indium oxide (ITO) coated glass was dipped in air in the solution and withdrawn at 42 cm/min. The coating was then fired to 250° C. in air. The thickness of the coating was 3,000 angstroms. When this coating was colored in a cell containing sulfuric acid (0.1 Normal) and a platinum counter electrode by applying negative 1.8 volts with reference to the counter electrode, the coating colored from 85% transmission to 10% transmission in 100 seconds measured at 550 nanometers.

Example 2

Tungsten peroxy acid product was prepared in the same manner as in Example 1. One gram of this powder was reacted with 6 milliliters of dry ethanol at 55° C. for about 20 minutes to about 40 minutes using a condenser. The solution was then filtered and the solvents were evaporated to dryness at 55° C. under reduced pressure. The resulting powder (peroxytungstic ester derivative) was stable during storage in air at room temperature for several days. A coating solution was made by dissolving 1 gram of this powder in 2 grams of dry ethanol. A conductive ITO coated glass was spin coated in air with this solution. The coating was then fired at 250° C. in air for 1 hour. Fired film thickness was 3300 angstroms. When this coating was tested as in Example 1, its luminous transmission in the bleached state was 65% and in the colored state was 19.9%.

Example 3

Tungsten peroxy acid product was prepared in the same manner as in Example 1. Fifty (50) grams of this powder was reacted with 300 milliliters of methanol to give an orange colored solution. The solution was then dried under reduced pressure to produce an orange peroxytungstic ester derivative. A coating solution was prepared from this new peroxytungstic ester derivative by mixing 1 gram of this product with 2 grams methanol. The solution was spin coated onto ITO and fired to 250° C., forming a 3500 angstroms thick film. When this coating was tested as in Example 1, it colored from a transmission (at 550 nanometers) of 75% to 12% in 360 seconds.

Example 4

A coating solution was prepared by dissolving 1 gram of the methanol derived peroxytungstic ester derivative (see Example 3 for peroxytungstic ester derivative preparation) in 2.5 grams dry ethanol. Complete dissolution required 8 days at room temperature. The solution was spin coated onto ITO coated glass and fired to 250° C. for 1 hour, producing a 3200 angstroms thick film. When this film was tested as in Example 1, it colored from 77% transmission (measured at 550 nanometers) to 19% transmission in 300 seconds. It bleached from 19% transmission to 77% in 8 seconds.

Example 5

A solution was prepared by reacting 2.5 grams tungsten peroxy acid product (as in Example 1) with 4.5 milliliters dry sec-butanol. This solution was spin coated on ITO coated glass and fired to 250° C. for 1 hour in air. When this coating was tested as in Example 1, its luminous transmission decreased from 68.6% to 50.1%.

Example 6

The method of Example 2 was followed, but the ratio of the solution of hydrogen peroxide and acetic acid was 75:25. A coating solution was made by dissolving 1 gram of the peroxytungstic ester derivative isolated thereby in 2.0 grams ethanol. An ITO coated glass was coated by spin coating at 2,000 rpm and after firing to 250° C. the coating thickness was 3,420 angstroms. The coating was cycled between the bleached and colored state several times without degradation. When tested as in Example 1, its luminous transmission decreased form 59.0% to 17.3% during coloration.

Example 7

A reaction flask was loaded with 6 grams of tungsten metal and placed in an ice bath. To the flask was added a 50:50 volume % mixture (100 milliliters) of propionic acid and hydrogen peroxide (30 volume %). The mixture was allowed to react for 24 hours and then heated to 60° C. for 18 hours. The solution was dried under vacuum to recover powdered tungsten peroxy acid product. Five (5) grams of this powder was dissolved in 25 milliliters of dry ethanol. The resulting solution was used to spin coat tungsten oxide coatings on ITC coated glass.

Example 8

The procedure described in Example 7 was repeated except a 50:50 volume ratio of glacial acetic and propionic acid was used instead of pure propionic acid. This solution was spin coated onto ITO glass at 2000 rpm yielding a film 8500 angstroms thick after firing. However, the coating had numerous cracks due to the shrinkage stresses generated in the film of this thickness. When tested as in Example 1, it colored from 78% to 2% luminous transmission in 400 seconds. Complete bleaching required only 45 seconds.

Example 9

Thirteen (13) grams of molybdenum metal was reacted with 50:50 volume % mixture of hydrogen peroxide (30 volume %) and glacial acetic acid for 24 hours at 0° C. The solids were filtered and the filtrate evaporated to dryness to recover the orange colored molybdenum peroxy acid product powder. This powder was added to the tungsten dipping solution described in Example 1 to give an atomic ratio of W to Mo equal to 1:0.008. An indium tin oxide coated glass was dipped in the solution and withdrawn at 45 cm/min. The coating was then fired to 250° C. The thickness of the coating was 3,500 angstroms. This coating was colored in a cell containing sulfuric acid (0.1 Normal) and a platinum counter electrode by applying negative 1.8 volts with reference to the two electrodes; its luminous transmission in the bleached state was 70.0% and in the colored state 23.9%.

Example 10

The procedure of Example 9 was repeated except the atomic ratio of W to Mo in the dipping solution was 87:13. When tested as in Example 1, the film colored from 67.9% to 10.8% luminous transmission.

Example 11

Five (5) grams of rhenium metal was placed in a reaction flask in an ice bath. To the flask was added 200 milliliters of an oxidizing mixture of 50:50 volume % hydrogen peroxide (30 volume %) and glacial acetic acid. The mixture was allowed to react for one hour and then warmed to room temperature and left reacting for a further 12 hours. Solvent was removed under reduced pressure to recover the brownish-red viscous liquid of the rhenium peroxy acid product. This derivative was added to the tungsten dipping solution described in Example 1 to give a W:Re atomic ratio equal to 1:0.008. A tin oxide coated glass was dipped in the solution and withdrawn at 45 cm/min. The coating was then fired at 250° C. in ambient atmosphere. The thickness of the coating was 4500 angstroms and it was cracked after firing. The coating was colored as described in Example 9 and colored from 59.6% transmission to 6.1% transmission in 90 seconds.

Example 12

A coating solution was prepared by dissolving 2.0 grams of peroxymolybdenum ester derivative in 100 milliliters anhydrous denatured ethanol (Tecsol TM 3 anhydrous) at room temperature. Total volume of solution was then reduced to 20 milliliters by removing solvent under reduced pressure. After filtering through a 0.45 nylon membrane filter, the solution was spin coated onto ITO coated glass at 2100 rpm and then fired to 250° C. in air. The resulting molybdenum oxide film was 4100 angstroms thick. When tested as in Example 1, the film colored from 63.8% to 23.8% luminous transmission.

CONCLUSION

In conclusion, the teaching of this invention is generally applicable to methods of making a wide variety of inorganic oxide coatings, such as electrically conducting coatings, optical coatings, wear-resistant coatings and anti-reflective coatings. The teachings of this invention can be used to accomplish dip coating, spray coating and spin coating. As shown above, the disclosed process is especially amenable to coating electrochromic oxides. This compares favorably to vacuum techniques where refractory oxide deposition typically requires electron-beam evaporation, reactive sputter deposition (DC or RF) or RF sputter deposition from a pressed oxide target. The present method is a non-vacuum technique. Equipment is thus relatively inexpensive. The process is easy to scale and it is amenable to coating very large substrates. The technique can be used to commercially coat glass panes of several square meter areas. Both dip coating and subsequent firing can be conducted in air. Also, the transition metal peroxy acid product and the transition metal peroxyester derivative can be isolated and stored. This means that dip solutions can be made as required and to precise volumes required.

Also note that the transition metal-peroxy acid product precursor of this invention and/or the transition metal-peroxy ester derivative precursor of this invention can serve as a precursor in a dip solution for a wide variety of coatings on substrates dipped therein. Such coatings can include electrochromic coatings, electrically conducting coatings, optical coatings, wear-resistant coatings, anti-reflective coatings and the like.

It is economical to coat thick oxide films. Using the preferred dip coating technique, the faster the withdrawal rate, the thicker the film. This compares very favorably to other techniques where, typically, a 5000 angstrom $WO_3$ coating takes roughly 10 times longer than a 500 angstrom coating.

While dip coating is preferred, spray or spin coating can be used instead of dip coating. In addition, the substrates can be coated on both sides simultaneously if desired.

Of course, it is understood that the above is merely a preferred embodiment of the invention and that various changes and alterations can be made without departing from the spirit and broader aspects thereof as set forth in the appended claims.

The exclusive property or privileges claimed are:

1. A method for preparing a precursor for use in forming electrochromic coatings comprising:

reacting a transition metal with hydrogen peroxide and an organic acid to form a transition metal-peroxy acid product.

2. A method in accordance with claim 1 wherein said transition metal-peroxy acid product is isolated.

3. A method in accordance with claim 2 wherein said transition metal is selected from the group consisting of tungsten, molybdenum, manganese, chromium, rhenium, iridium and nickel.

4. A method in accordance with claim 3 wherein said organic acid is selected from the group consisting of acetic acid and propionic acid.

5. A method in accordance with claim 4 wherein said transition metal is allowed to react with said hydrogen peroxide and an organic acid at a temperature of from about −10° C. to about 12° C. for a period of from about 18 to about 30 hours, and is then refluxed at from about 45° C. to about 60° C. for a period of from about 18 to about 10 hours to form said transition metal-peroxy acid product.

6. A method in accordance with claim 1 wherein said transition metal is allowed to react with said hydrogen peroxide and organic acid at a temperature of from about −10° C. to about 12° C. for a period of from about 18 to about 30 hours, and is then refluxed at from about 45° C. to about 60° C. for a period of from about 18 to about 10 hours, to form said transition metal-peroxy acid product.

7. A method for preparing a precursor for use in forming electrochromic coatings comprising:

reacting a transition metal with hydrogen peroxide and an organic acid to form a transition metal-peroxy acid product and reacting said transition metal-peroxy acid product with a lower carbon alcohol to form a peroxyester transition metal derivative.

8. A method in accordance with claim 7 wherein said transition metal-peroxy acid product is isolated prior to reacting with said lower carbon alcohol.

9. A method in accordance with claim 8 wherein said transition metal is selected from the group consisting of tungsten, molybdenum, manganese, chromium, rhenium, iridium and nickel.

10. A method in accordance with claim 9 wherein said lower carbon alcohol is selected from the group consisting of methanol, ethanol, propanol, isopropanol, sec-butanol and mixtures thereof.

11. A method in accordance with claim 10 wherein said organic acid is selected from the group consisting of acetic acid and propionic acid.

12. A method in accordance with claim 11 wherein said transition metal is allowed to react with said hydrogen peroxide and an organic acid at a temperature of from about −10° C. to about 12° C. for a period of from about 18 to about 30 hours, and is then refluxed at from about 45° C. to about 60° C. for a period of from about 18 to about 10 hours to form said transition metal-peroxy acid product.

13. A method in accordance with claim 7 wherein said transition metal is allowed to react with said hydrogen peroxide and an organic acid at a temperature of from about −10° C. to about 12° C. for a period of from about 18 to about 30 hours, and is then refluxed at from about 45° C. to about 60° C. for a period of from about 18 to about 10 hours to form said transition metal-peroxy acid product.

14. A method in accordance with claim 7 further comprising the step of reacting a second metal with hydrogen peroxide and an organic acid to form a second metal-peroxy acid product and mixing said second metal-peroxy acid product with said peroxyester-transition metal derivative to form a peroxyester-transition metal/second metal-peroxy acid mixture.

15. A method in accordance with claim 14 further comprising the step of reacting said second metal-peroxy acid product with a lower carbon alcohol to form a peroxyester-second metal derivative prior to mixing with said peroxyester-transition metal derivative.

16. A method in accordance with claim 15 wherein said second metal is selected from the group consisting of tungsten, molybdenum, manganese, chromium, rhenium, iridium, nickel, silicon and titanium.

17. A method in accordance with claim 16 wherein said organic acid is selected from the group consisting of acetic acid and propionic acid.

18. A method in accordance with claim 17 wherein said transition metal is allowed to react with said hydrogen peroxide and an organic acid at a temperature of from about −10° C. to about 12° C. for a period of from about 18 to about 30 hours, and is then refluxed at from about 45° C. to about 60° C. for a period of from about 18 to about 10 hours to form said transition metal-peroxy acid product.

19. A precursor for forming a coating for a substrate comprising a transition metal-peroxy acid product formed by:

reacting a transition metal with hydrogen peroxide and an organic acid to form a transition metal-peroxy acid product.

20. The precursor of claim 19 wherein said transition metal-peroxy acid product is isolated.

21. The precursor of claim 20 wherein said transition metal is selected from the group consisting of tungsten, molybdenum, manganese, chromium, rhenium, iridium and nickel.

22. The precursor of claim 21 wherein said organic acid is selected from the group consisting of acetic acid and propionic acid.

23. The precursor of claim 22 wherein said transition metal is allowed to react with said hydrogen peroxide and an organic acid at a temperature of from about −10° C. to about 12° C. for a period of from about 18 to about 30 hours, and is then refluxed at from about 45° C. to about 60° C. for a period of from about 18 to about 10 hours to form said transition metal-peroxy acid product.

24. The precursor of claim 19 wherein said transition metal is allowed to react with said hydrogen peroxide and organic acid at a temperature of from about −10° C. to about 12° C. for a period of from about 18 to about 30 hours, and is then refluxed at from about 45° C. to about 60° C. for a period of from about 18 to about 10 hours, to form said transition metal-peroxy acid product.

25. A precursor for forming a coating for a substrate by a coating technique selected from the group consisting of dip coating, spray coating and spin coating, said precursor comprising a transition metal-peroxy acid product formed by reacting a transition metal with hydrogen peroxide and an organic acid to form a transition metal-peroxy acid product.

26. A precursor for forming a coating having electrochromic, electrically conducting, optical, wear-resistant or anti-reflective properties, or combinations of these properties, for a substrate, said precursor comprising a transition metal-peroxy acid product formed by reacting a transition metal with hydrogen peroxide and an organic acid to form a transition metal-peroxy acid product.

27. A precursor for forming a coating for a substrate comprising a transition metal-peroxy acid product formed by:
   reacting an oxidizable transition metal species with a solution of a mixture of hydrogen peroxide and an organic acid.

28. The precursor of claim 27, wherein said oxidizable transition metal species is selected from the group consisting of a metal halide and a metal carbide.

29. The precursor of claim 28 wherein said oxidizable transition metal species is tungsten carbide.

30. The precursor of claim 27 wherein said organic acid is selected from the group consisting of acetic acid and propionic acid.

31. A precursor for forming a coating for a substrate by a coating technique selected from the group consisting of dip coating, spray coating and spin coating, said precursor comprising a transition metal-peroxy acid product formed by reacting an oxidizable transition metal species with a solution of a mixture of hydrogen peroxide and an organic acid.

32. A precursor for forming a coating having electrochromic, electrically conducting, optical, wear-resistant or anti-reflective properties, or combinations of these properties, for a substrate, said precursor comprising a transition metal-peroxy acid product formed by reacting an oxidizable transition metal species with a solution of a mixture of hydrogen peroxide and an organic acid.

* * * * *

UNITED STATES PATENT AND TRADEMARK OFFICE
CERTIFICATE OF CORRECTION

PATENT NO.  : 5,457,218
DATED       : October 10, 1995
INVENTORS   : John P. Cronin et al.

It is certified that error appears in the above-identified patent and that said Letters Patent is hereby corrected as shown below:

Column 7, Line 35:

"ITC" should be --ITO--.

Signed and Sealed this

Sixteenth Day of April, 1996

Attest:

BRUCE LEHMAN

Attesting Officer

Commissioner of Patents and Trademarks